(12) United States Patent
Olah et al.

(10) Patent No.: US 6,816,057 B2
(45) Date of Patent: Nov. 9, 2004

(54) SEGMENTED CROSSPOINT SWITCH ARRAY

(75) Inventors: Robert Allen Olah, Sunnyvale, CA (US); William E. Moss, Sunnyvale, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 333 days.

(21) Appl. No.: 09/766,010

(22) Filed: Jan. 19, 2001

(65) Prior Publication Data

US 2002/0097140 A1 Jul. 25, 2002

(51) Int. Cl.$^7$ .............................................. H03K 17/00
(52) U.S. Cl. ..................................... 340/2.29; 340/2.2
(58) Field of Search .............................. 340/2.29, 2.28, 340/2.2, 6, 2.21, 2.23, 2.25, 2.26, 2.8; 326/39, 41, 47; 327/107, 109, 493, 583; 710/317

(56) References Cited

U.S. PATENT DOCUMENTS 4,973,956 A * 11/1990 Lin et al. ..................... 340/2.2

* cited by examiner

Primary Examiner—Michael Horabik
Assistant Examiner—William Bangachon
(74) Attorney, Agent, or Firm—Daniel J. Bedell; Smith-Hill and Bedell

(57) ABSTRACT

A switch for routing input signals from any of N input terminals to one or more of M output terminals includes a high-speed N×M crosspoint switch array providing the necessary signal paths. Each of a set of N input drivers buffers a separate one of the input signals into the crosspoint array and each of a set of M output drivers buffers an array output signal onto a separate one of the output terminals. The crosspoint switch array is horizontally and/or vertically segmented by input and output buffers to limit the amount of the array's capacitance that each input driver must charge and discharge when the input signals change state, thereby reducing signal path delay through the crosspoint array.

16 Claims, 8 Drawing Sheets

SEGMENTED CROSSPOINT SWITCH ARRAY

BACKGROUND OF THE INVENTION

1. Field of the Invention

The present invention relates in general to integrated circuit crosspoint switches and in particular to a crosspoint switch array composed of interconnected crosspoint switch arrays.

2. Description of Related Art

Figure 1:
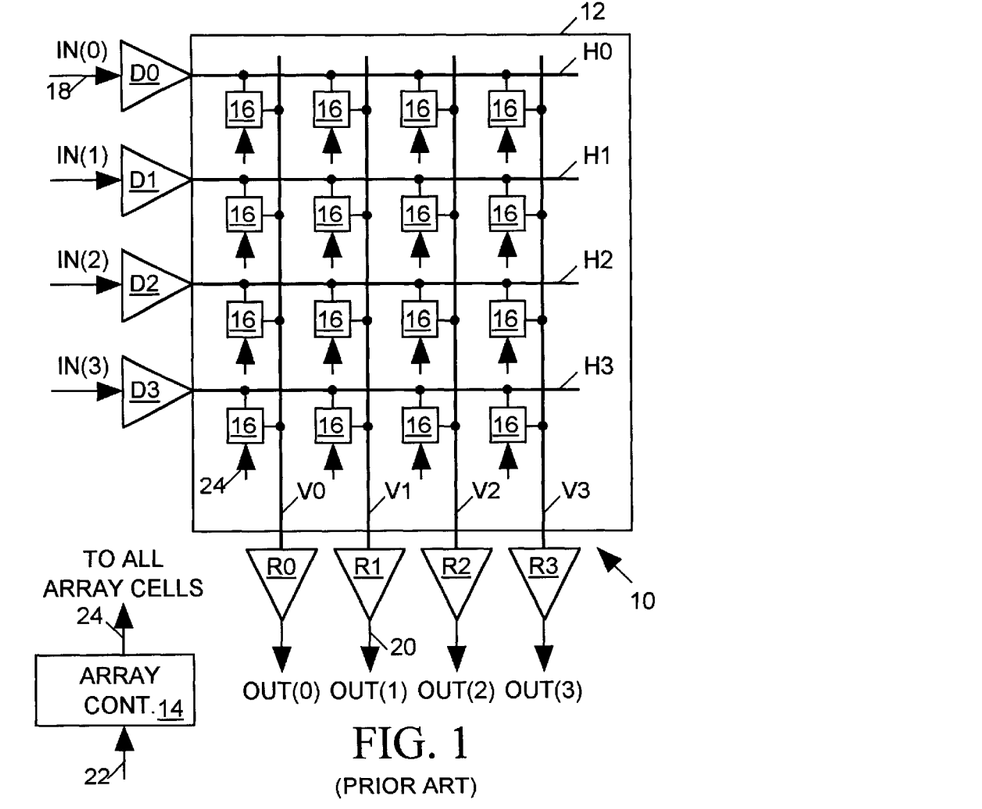
FIG. 1 illustrates a prior art crosspoint switch in block diagram form.

An N×M crosspoint switch, such as disclosed for example in U.S. Pat. No. 5,790,048 issued Aug. 4, 1998 to Hsieh et al, employs an array of pass transistors to selectively route input signals arriving at any of N input ports to any of M output ports. FIG. 1 illustrates a simplified example 4×4 crosspoint switch 10 as might be implemented within a single integrated circuit. Crosspoint switch 10 includes a set of four input signal drivers D0–D3 acting as input ports, a set of four receivers R0–R3 acting as output ports, a switch cell array 12 for selectively providing signal paths between drivers D0–D3 and receivers R0–R3, and array controller 14. Array 12 includes four rows and four columns of switch cells 16. Each of four conductive input lines H0–H3 lines deliver the output of a separate one of drivers D0–D3 to a separate row of switch cells 16. Each of four conductive output lines V0–V3 lines link a separate column of switch cells 16 to an input of a separate one of receivers R0–R3. Each switch cell 16 can selectively provide a signal path between one of input lines H0–H3 and one of output lines V0–V3. Controller 14 writes single bit control data into a memory cell within each switch cell 16, and the state of the bit controls whether or not the cell is to provide the signal path. Commands arriving on a control bus 22 from an external source such as a host computer tell controller 14 how to set the states of the control bits stored in the various switch cells 16.

For example, when driver D0 receives input signal IN(0) arriving at one of switch input terminals 18, it buffers the signal onto its corresponding input line H0. Each one of the four switch cells 16 that are linked to driver input line H0 and that are currently configured by their stored control data bit to provide a signal path, then forwards the signal to one of receivers R0–R3 via its corresponding output line V0–V3. Each receiver R0–R3 that receives the signal then buffers the signal onto one of four switch output terminals 20 as one of output signals OUT(0)–OUT(3).

Figure 2:
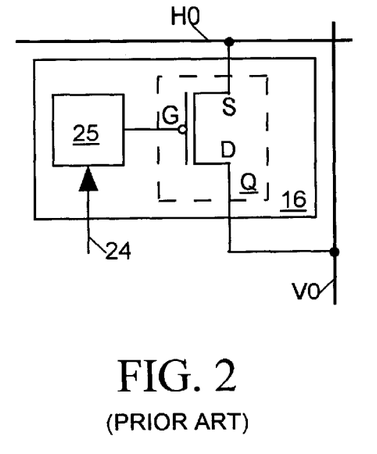
FIG. 2 illustrates one of the switch cells of the crosspoint switch of FIG. 1 in more detailed block diagram form.

FIG. 2 illustrates in more detail the upper left hand switch cell of the prior art crosspoint switch 10 of FIG. 1, including driver D0, input line H0, output line V0 and switch cell 16 linking input line H0 to output line V0 and receiver R0. Switch cell 16 includes a pass transistor Q having its source terminal S connected to input line H0 and its drain terminal D connected to output line V0. Switch cell 16 also includes a memory cell 25 for storing control data. A controller (not shown) uses control line 24 to write a bit into memory cell 25 of cell 16. Transistor Q passes signals from input line H0 to output line V0 when the bit in memory cell 25 turns transistor Q on and inhibits a signal on line H0 from passing to output line V0 when the bit turns transistor Q off.

Although for simplicity array 12 is illustrated as a 4×4 switch cell array, switch cell arrays of similar design can be expanded to provide flexible routing paths between much larger numbers of input and output ports. Regardless of the dimensions of crosspoint switch 10, we would like the crosspoint switch to route signals with as little delay as possible. However crosspoint switch 10 can exhibit significant signal path delay which can increase as we increase the N×M dimensions of array 12.

Referring again to FIG. 2, assume that pass transistor Q of the switch cell 16 linking input line H0 to output line V0 is on and that the pass transistors of all other switch cells in the array are off. When input signal IN(0) to driver D0 changes state, output signal OUT(0) produced by receiver R0 will also change state with a time delay that is the sum of the inherent delays of driver D0 and receiver R0 and the signal path delay through switch cell array 12. The signal path delay arises in large part because the output signal produced by driver D0 on line H0 must charge or discharge all of the shunt capacitance of the input line H0 and output line V0 before it can force receiver R0 to drive OUT(0) to another state. That shunt capacitance includes not only the inherent capacitances of those lines and the input capacitance of receiver R0, it also includes the capacitance associated with all transistors connected to both input line H0 and output line V0.

Figure 3:
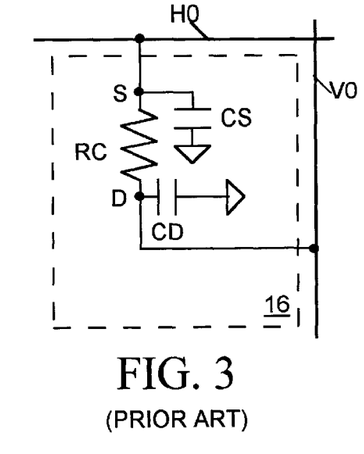
FIG. 3 is a schematic diagram depicting an impedance a model of the switch cell of FIG. 2.

FIG. 3 is an impedance model of the pass transistor Q of the switch cell 16 illustrated in FIG. 2. Input line H0 and output line V0 of the array are connected to the source S and drain D terminals of transistor Q respectively. The gate of transistor Q is represented by a series channel resistance RC. When transistor Q is on the series resistance is small and the switch cell provides a low impedance signal path between input line H0 and output line V0. When pass transistor Q turns off, series channel resistance RC becomes large, thereby essentially breaking the signal path between input and output lines H0 and V0. Regardless of the switching state of transistor Q, the driver D0 of FIG. 1 that buffers input signal IN(0) onto input line H0 must charge the shunt capacitance CS at the transistors source terminal S. When transistor Q is on, driver D0 must also charge the shunt capacitance CD at the drain terminal D of transistor Q.

Figure 4:
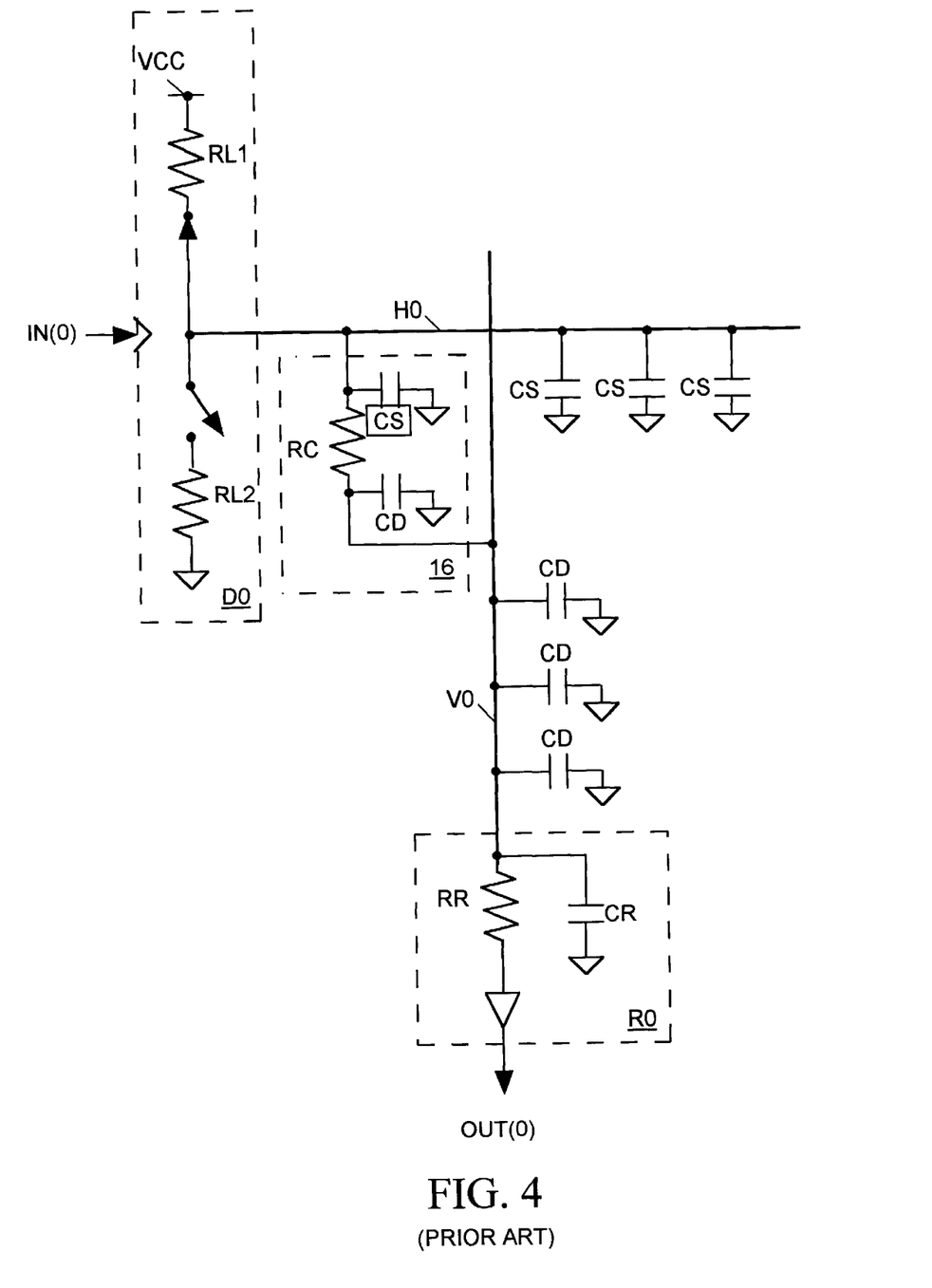
FIG. 4 is a schematic diagram depicting an impedance model of one signal path through the crosspoint switch of FIG. 1.

FIG. 4 is a simple model of the capacitive loading the 4×4 array shown in FIG. 1 places on driver D0 when the upper left hand switch cell 16 is closed (its transistor Q being turned on to provide a signal path between the H0 and V0 lines) while all the other cells connected to lines H0 and V0 are open. When IN(0) is high the output stage of driver D0 connects line H0 through a load resistor RL1 to a positive voltage source VCC. When IN(0) is low, driver D0 grounds line H0 through a load resistor RL2.

To cause the output receiver R0 to drive the OUT(0) signal high or low, input driver D0 must charge or discharge the source terminal capacitances CS of all four switch cells 16 of FIG. 1 tied to input line H0, the drain terminal capacitances CD of all four switch cells 16 tied to output line V0, and the input capacitance of output receiver R0. Since charging or discharging all of that capacitance takes time, their is a delay between a change in state of the IN(0) signal and there is a corresponding change in state of the OUT(0) signal.

When we increase the size of the array, for example from 4×4 to 8×8, input and output lines H0 and V0 will each be connected to eight cells, rather than four. Thus driver D0 will have to charge or discharge eight, rather than four, source capacitances and eight, rather than four, drain capacitances. Thus the signal path delay through a crosspoint switch increases with the size of the switch.

A driver charges a capacitor at a rate in inverse relation to the product of its capacitance and the series resistance between the driver's voltage source and the capacitor. Thus one way to reduce the signal path delay through array 12 is to increase the size of drivers D0–D3 (i.e., reduce the size of their load resistors RL1 and RL2 so that they can conduct more current when charging and discharging capacitance). This reduces the time the drivers need to charge or discharge the capacitance of array 12, thereby reducing signal path delay. However since there are practical limits to how much current a driver can supply, we need to provide other ways to further reduce signal path delay.

We could also reduce signal path delay by reducing the capacitance of pass transistors Q by making them smaller. However, smaller pass transistors have higher channel resistance. Since charging rates is proportional to the product of capacitance and resistance, increasing channel resistance tends to offset the effects of reducing channel capacitance. Therefore, while we can attain some delay reduction by optimizing the tradeoff between the capacitance and resistance of pass transistors Q, there are limits to this approach as well.

Therefore it would beneficial to provide yet another way to attain further reductions in signal path delay through array 12. What is needed is an architecture for a large crosspoint switch that helps reduce signal path delay.

SUMMARY OF THE INVENTION

An N×M crosspoint switch in accordance with the invention routes input signals from any of N input terminals to one or more of M output terminals. The crosspoint switch includes N drivers, M receivers, and a crosspoint switch array. Each of the N drivers buffers a separate one of the input signals arriving at an input terminal into the crosspoint switch array and each the M receivers buffers an array output signal onto a separate one of the output terminals. The crosspoint switch array provides the necessary routing signal paths.

In accordance with one aspect of the invention, the crosspoint array is formed by rows and/or columns of crosspoint switch sub-arrays, wherein each row of sub-arrays receives input signals from a corresponding subset of the input drivers and each column of sub-arrays forwards signals to a separate subset of receivers.

In accordance with another aspect of the invention, when the crosspoint switch cell array includes more than one column of sub-arrays, each sub-array has an associated set of input buffers for buffering outputs of the input signal drivers into the sub-array rows. Therefore each input signal driver that forwards an input signal to the sub-arrays of a given row need charge or discharge only the input capacitance of the buffers for that row and need not charge any capacitance of the sub-arrays themselves. The sub-array buffers handle that task. Since several buffers provide array capacitance charging or discharging current, they can quickly charge or discharge the signal path capacitance when an input signal changes state. Thus segmenting the crosspoint switch into more than one column of sub-arrays reduces signal path delay through the crosspoint switch because it reduces the time required to charge and discharge the array's capacitance.

In accordance with a further aspect of the invention, when the crosspoint switch array includes more than one row of sub-arrays, a set of output buffers (implemented, for example, by a set of OR gates) are provided to separately buffer the output signals of the various sub-arrays of each row onto the inputs of the switch's output drivers. The sub-array output buffers isolate output capacitances of the sub-arrays from one another so that input buffers need only charge or discharge the output capacitance of a particular sub-array that is currently routing a signal to a given output buffer. Thus segmenting the crosspoint switch into more than one row of sub-arrays also reduces signal path delay through the crosspoint switch because it also reduces the time required to charge and discharge signal path capacitance.

It is accordingly an object of the invention to provide a segmented crosspoint switch having relatively low signal path delay.

The concluding portion of this specification the art will best understand both the organization and method of operation of the invention, together with further advantages and objects thereof, by reading the remaining portions of the specification in view of the accompanying drawing(s) wherein like reference characters refer to like elements.

DETAILED DESCRIPTION OF THE INVENTION

The present invention relates to an architecture for a high-speed, integrated circuit N×M crosspoint switch for selectively routing signals between N input ports and M output ports. Although the crosspoint switch architecture is particularly suited for implementing switches having large numbers of input and output ports, for simplicity a simple 4×4 version of the crosspoint switch is described herein. However, it will be apparent to those of skill in the art that the 4×4 crosspoint switch architecture can be easily scaled up to implement crosspoint switches of large dimensions.

Horizontally Segmented Array

Figure 5:
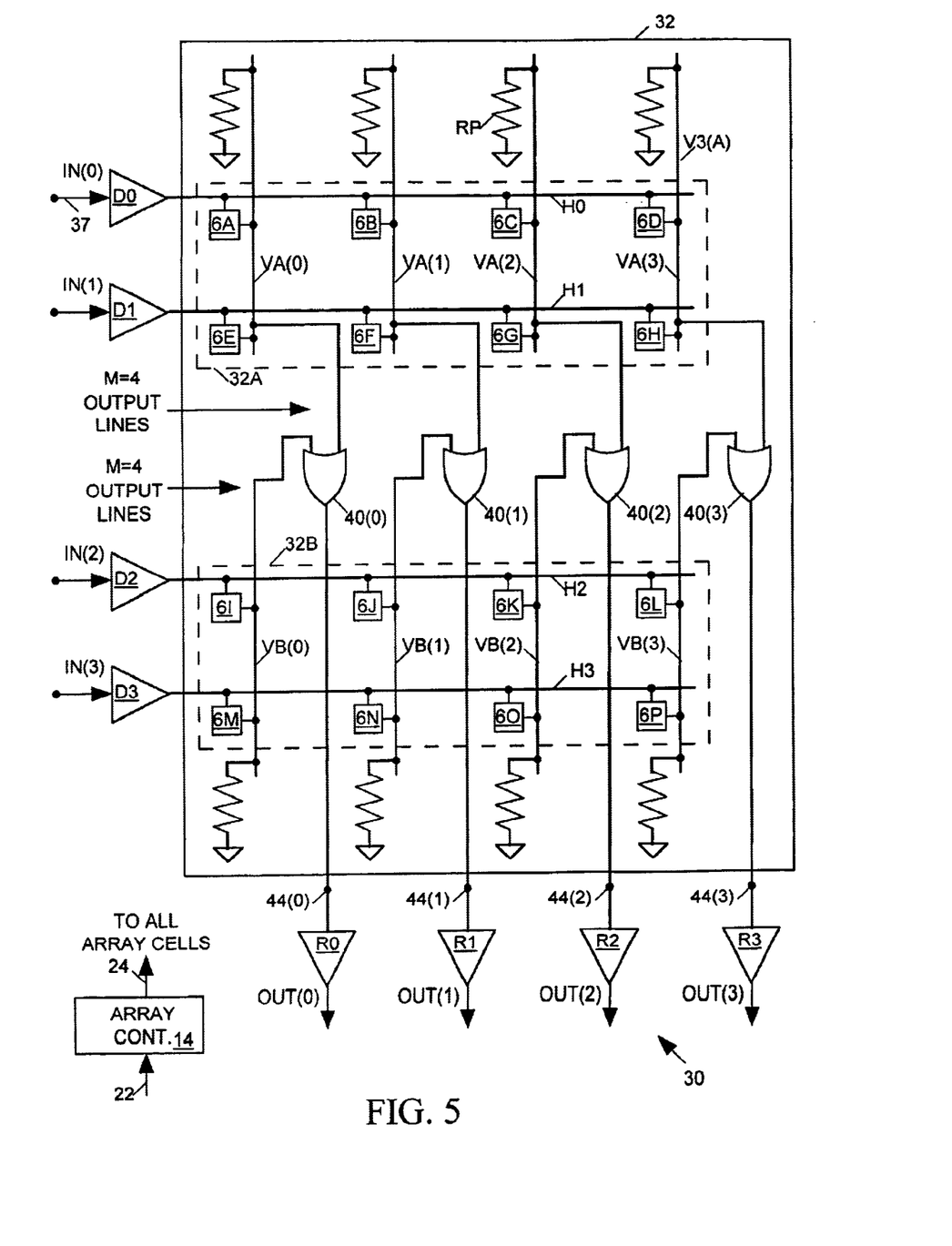
FIG. 5 illustrates in block diagram form a crosspoint switch in accordance with a first embodiment of the invention.

FIG. 5 illustrates an example 4×4 crosspoint switch 30 in accordance with the invention. Switch 30 includes four drivers D0–D3, four receivers R0–R3, and a 4×4 switch cell array 32. An array controller 14 responds to commands from an external host computer (not shown) by configuring array 32 to provide desired signal paths between drivers D0–D3 and the array's output terminals 44(0)–44(3). Receivers R0–R3 buffer signals appearing at array output terminals 44(0)–44(3) to produce the output signals OUT(0)–OUT(3) of switch 30.

In accordance with the invention, the 4×4 array 32 is formed by a pair of 2×4 sub-arrays 32A and 32B, each driving separate inputs of a set of four OR gates 40(0)–40 (3). Sub-array 32A selectively routes output signals of drivers D0 and D1 to first inputs of OR gates 40(0)–40(3) while sub-array 32B selectively routes output signals of drivers D2 and D3 to second inputs of OR gates 40(0)–40 (3). Each OR gate 40(0)–40(3) acts as a buffer to buffer output signals of sub-arrays 32A and 32B onto output terminals 44(0)–44(3).

Sub-array 32A includes a pair of input lines H0 and H1, four output line segments VA(0)–VA(3) and eight switch cells 6A–6H, each selectively linking one of input lines H0 and H1 to one of output line segments VA(0)–VA(3). Similarly, sub-array 32B includes two input lines H2 and H3, four output line segments VB(0)–VB(3), and a separate set of eight switch cells 6I–6P, each linking one of input lines H2 and H3 to one of output line segments VB(0)–VB(3). Each output line segment VA(0)–VA(3) and VB(0)–VB(3) of sub-arrays 32A and 32B drives a respective input of corresponding OR gates 40(0)–40(3).

Each switch cell 6A–6P, suitably implemented by prior art switch cell 16 of FIG. 2, stores a control bit in an internal memory cell 25. As seen in FIG. 2, the control bit in memory cell 25 drives the gate of a complementary metal oxide semiconductor CMOS pass transistor Q linking an array input line to an array output line. The control bit therefore determines whether pass transistor Q makes or breaks a signal path between the input and output lines. Array controller 14, linked to all switch cells 6A–6P via a set of control lines 24, configures the routing paths through array 32 by setting the states of the control bits in the memory cell 25 of each switch cell 6A–6P.

When the external host computer wants crosspoint switch 30 to route, for example, input signal IN(1) to output terminal 44(2), it commands controller 14 to close (turn on the pass transistor of) switch cell 6G. Driver D1 buffers input signal IN(1) onto input line H1 and cell 6G conducts the signal from input line H1 to output line segment VA(2), which then forwards the signal to OR gate 40(2). OR gate 40(2) then buffers the IN(1) signal onto output terminal 44(2) at the input of receiver R2. Receiver R2 then produces the output signal OUT(2) in response to the IN(1) signal at its input.

When none of drivers D0–D3 is actively driving any of line segments VA(0)–VA(3) or VB(0)–VB(3) a pull-down resistor RP weakly pulls down on the line segment to prevent the line segment's corresponding OR gate 40(0)–40 (3) input from floating to a high logic level.

Figure 6:
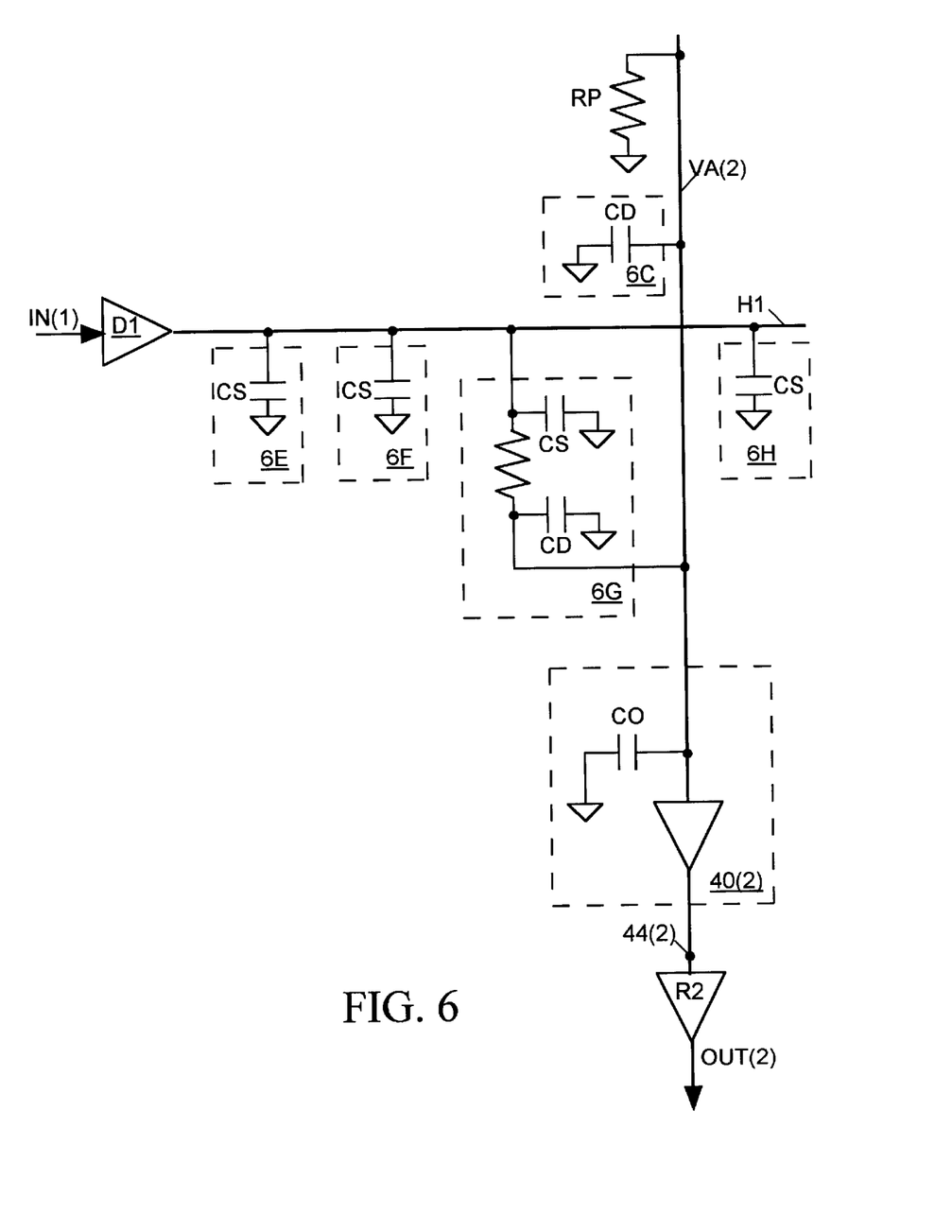
FIG. 6 is a schematic diagram depicting an impedance model of a signal path through the crosspoint switch of FIG. 5.

FIG. 6 is an impedance model of the path input signal IN(1) follows through array 32 to reach output terminal 44(2). The impedance of cell 6G is modeled as source capacitance CS, a series channel resistance RC and a drain capacitance CD as illustrated in FIG. 3, The input impedance of OR gate 40(2) is modeled by a shunt capacitor CO. In addition to the capacitive loads CS and CD of closed switch cell 6G, driver D1 must also charge the source capacitances CS of the three open switch cells 6E, 6F and 6H connected to input line H1, the drain capacitance CD of the open switch cell 6C on output line segment VA(2) and the input capacitance CO of OR gate 40(2). Note that whereas a total of four drain capacitances appear in the path of input signal IN(1) in FIG. 4, only two drain capacitance appear in the path of input signal IN(1) in FIG. 6. This reduction in path capacitance arises because OR gate 40(2) isolates the drain capacitances of switch cells 6J and 6N from the IN(1) signal path. By reducing the amount of capacitance the IN(1) signal must charge, we reduce its path delay.

While the reduction in path capacitance achieved by segmenting a 4×4 array into two smaller arrays is relatively small (the sum of two pass transistor drain capacitances) the reduction in path capacitance becomes much more significant as size of the crosspoint switch array increases. For example by vertically segmenting a 512×512 crosspoint array into two sub-arrays, we can reduce the path capacitance for each input signal by the sum of 256 drain capacitances. Thus as the size of the crosspoint switch array increases, so too does the speed advantages obtained by segmenting the crosspoint switch array. Further reduction of capacitive loading in crosspoint switch arrays larger than 4×4 can be achieved by organizing them into more than two segments. For example, a 512×512 crosspoint switch array could be segmented into four 128×512 sub-arrays to reduce the pass transistor drain capacitance load for each array input driver from 512 to 128.

Vertically Segmented Array

Figure 7:
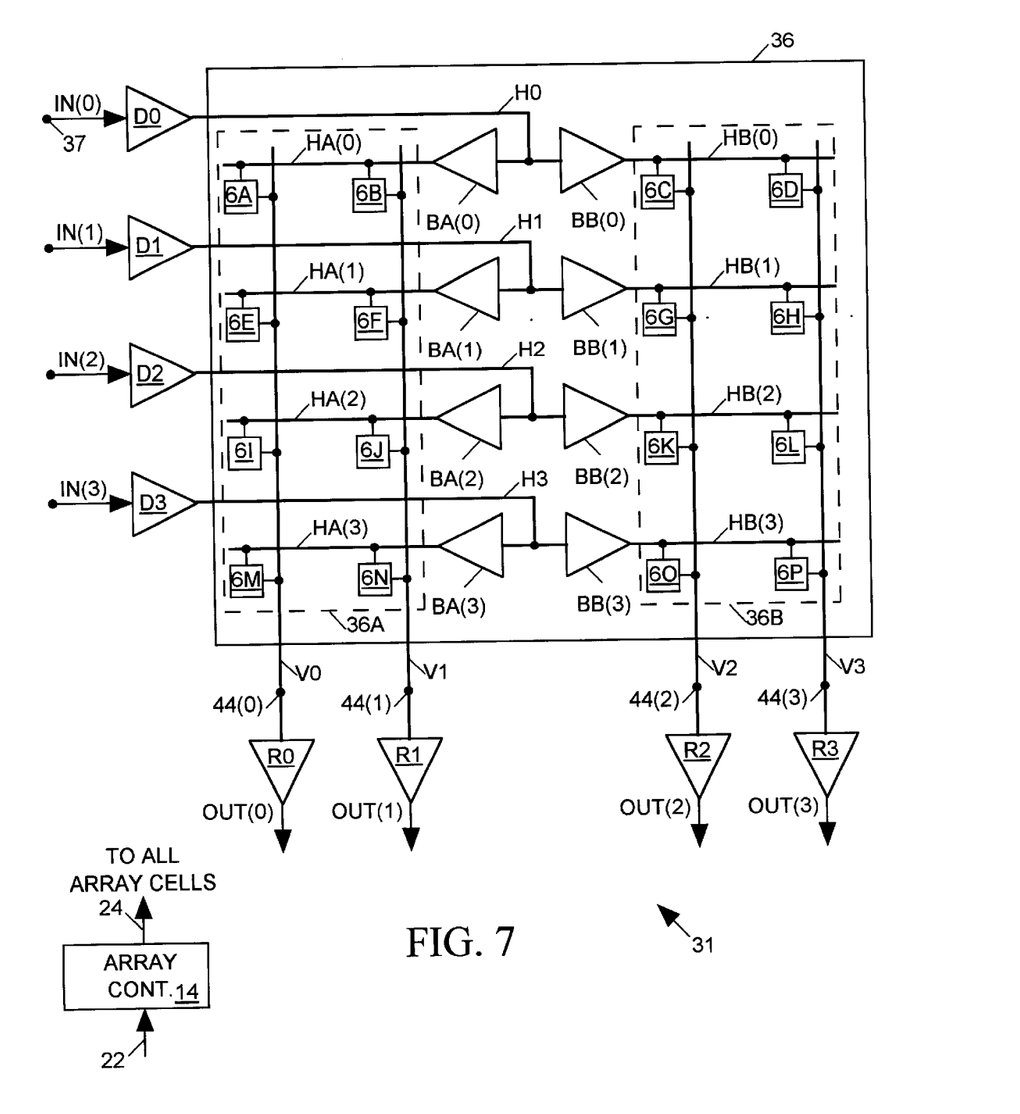
FIG. 7 illustrates in block diagram form a crosspoint switch in accordance with a second embodiment of the invention.

FIG. 7 illustrates a 4×4 crosspoint switch 31 in accordance with an alternative embodiment of the present invention which segments a crosspoint switch array 36 vertically (rather than horizontally as in FIG. 5) into two sub-arrays 36A and 36B to reduce the amount of pass transistor source (rather than drain) capacitance linked to each signal path through the switch.

Crosspoint switch 31 also routes four input signals IN(0)–IN(3) through a crosspoint switch array 36 to four output terminals 44(0)–44(3). Four drivers D0–D3 buffer signals IN(0)–IN(3) from respective input terminals 37 to corresponding array input lines H0–H3, each linked to the inputs of a corresponding pair of buffers (BA(0), BB(0))–(BA(3), BB(3)). Buffers BA(0)–BA(3) and BB(0)–BB(3) buffer corresponding signals IN(0)–IN(3) onto input line segments HA(0)–HA(3) and HB(0)–HB(3), respectively, of sub-arrays 36A and 36B.

Switch sub-array 36A includes a pair of output lines V0 and V1 and a set of eight switch cells 6A, 6B, 6E, 6F, 6I, 6J, 6M, and 6N, each selectively linking one of line segments HA(0)–HA(3) to one of lines V0 and V1. Similarly, switch sub-array 36B includes a separate pair of output lines V2 and V3 and a separate set of eight switch cells 6C, 6D, 6G, 6H, 6K, 6L, 60, and 6P, each linking one of lines HB(0)–HB(3) to one of lines V2 and V3. Lines V0–V3 convey each corresponding output signal of sub-arrays 36A and 36B to a corresponding one of terminals 44(0)–44(3). Receivers R0–R3 then generate output signals OUT(0)–OUT(3) in response to signals appearing on corresponding output terminals 44(0)–44(3).

When the external host computer wants crosspoint switch 31 to route, for example, input signal IN(1) to output terminal 44(2), it commands controller 14 to close cell 6G. Driver D1 forwards IN(1) via input line H1 to buffer BB(1), and buffer BB(1) then buffers the signal onto input line segment HB(1). Cell 6G conducts IN(1) from line segment HB(1) onto line V2 where IN(1) is conveyed to output terminal 44(2). Receiver R2 then buffers the signal at terminal 44(2) to produce output signal OUT(2).

Figure 8:
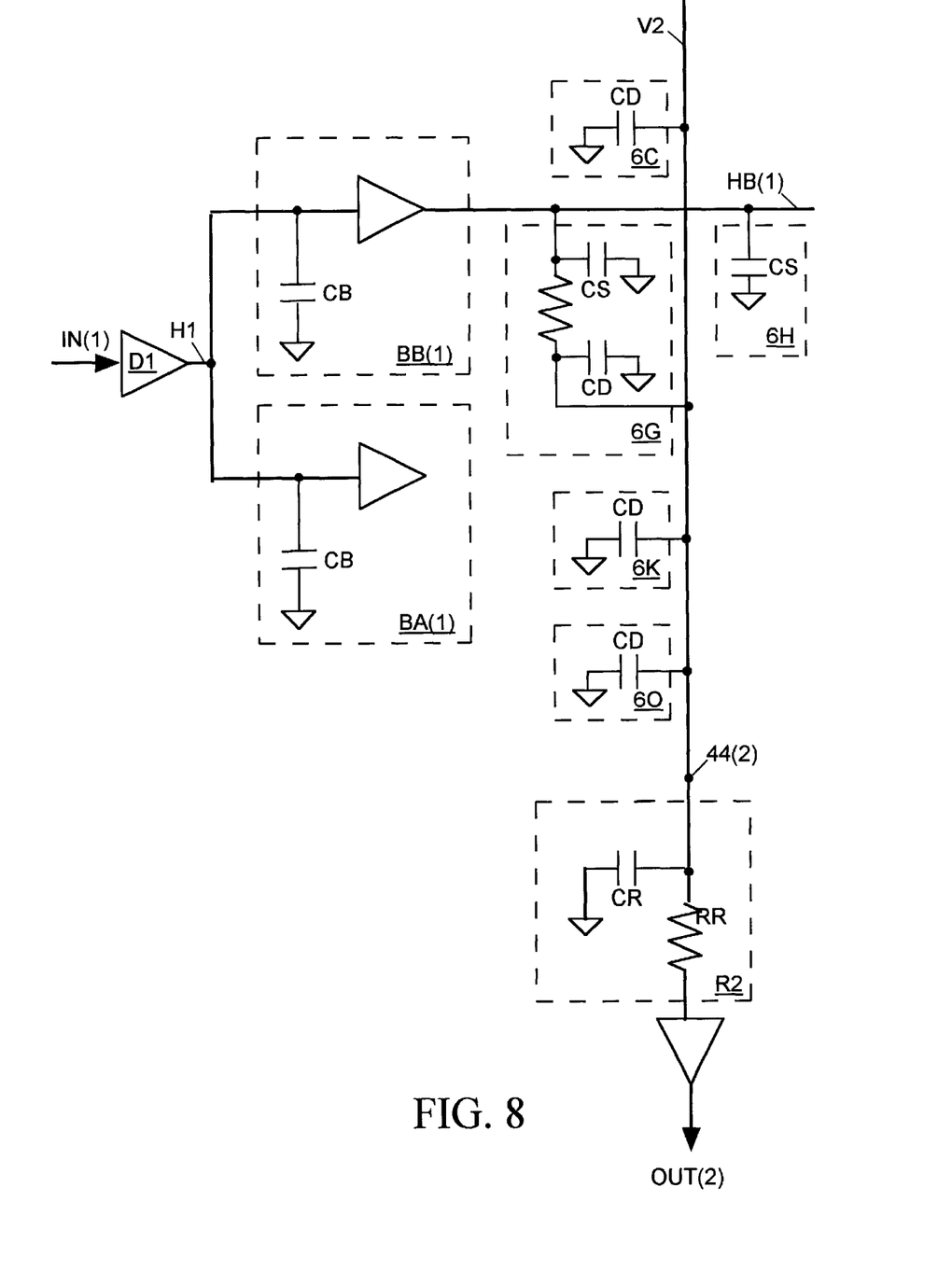
FIG. 8 is a schematic diagram depicting an impedance model of a signal path through the crosspoint switch of FIG. 7.

FIG. 8 is an impedance model of the path signal IN(1) follows through array 36 to reach terminal 44(2). Driver D1 buffers input signal IN(1) onto the inputs of buffers BB(1) and BB(2). Each buffer BB(1) and BB(2) loads driver D1 with an input capacitance CB. However each buffer has a large input resistance which serves to isolate driver D1 from the capacitive load of either sub-array 36A or 36B. Thus driver D1 has to charge or discharge only the capacitances CB of buffers BB(1) and BA(1) when input signal IN(1) changes state.

When its input changes state, buffer BB(1) must charge the source capacitances CS of two switch cells 6G and 6H, the drain capacitances CD of four switch cells 6C, 6G, 6K and 6O, and the input capacitance CR of output receiver R2. Note that whereas the signal path of FIG. 8 includes only two source capacitances CS, the signal path of the prior art crosspoint switch includes four source capacitances, as illustrated in FIG. 4.

While the capacitance reduction advantage of horizontally segmenting 4×4 crosspoint switch array 36 in the manner illustrated in FIG. 7 is not large, the advantage of horizontal segmentation increases as we increase the size of the crosspoint array. For example by horizontally segmenting a 512×512 crosspoint array into two sub-arrays, we reduce the path capacitance for each input signal by the sum of 256 pass transistor source capacitances. Further reduction of capacitive loading in crosspoint switch arrays larger than 4×4 can be achieved by horizontally segmenting such arrays into more than two segments. For example, a 512×512 crosspoint switch array could be segmented into four 128× 512 sub-arrays to reduce capacitive loading by the sum of 384 pass transistor source capacitances.

Horizontally and Vertically Segmented Array

The notions of horizontally and vertically segmenting a crosspoint array are not mutually exclusive; we can segment a crosspoint array both horizontally and vertically to reduce both the source and the drain capacitance present on all signal paths.

Figure 9:
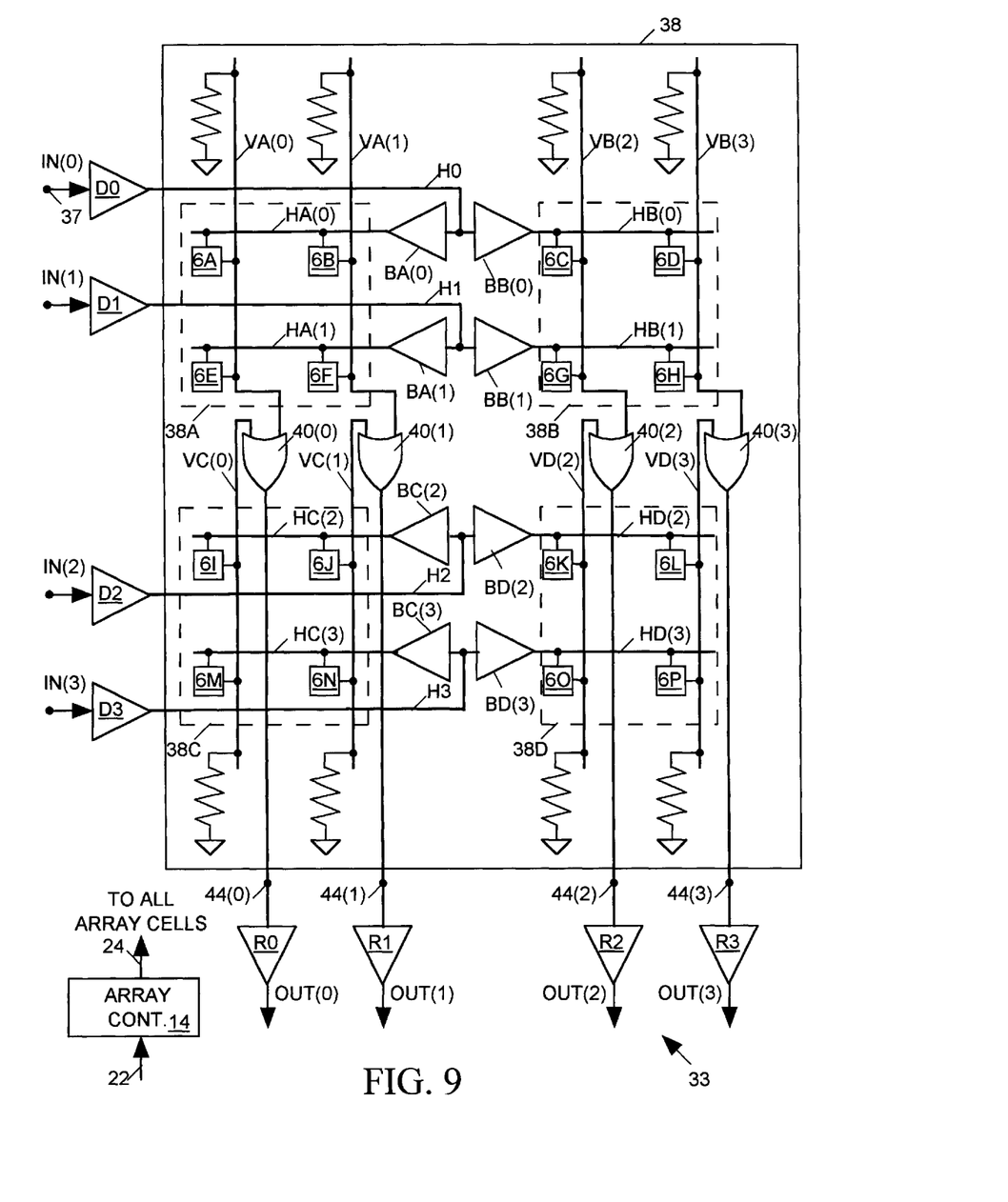
FIG. 9 illustrates in block diagram form a crosspoint switch in accordance with a third embodiment of the invention.

FIG. 9 illustrates a crosspoint switch 33 in accordance with a third embodiment of the invention wherein 4×4 crosspoint array 38 is segmented both horizontally and vertically into an array of two rows and two columns of 2×2 sub-arrays 38A–38D. A set of buffers BA(0)–BD(3) and a set of OR gates 40(0)–40(3) buffer signals into and out of array 38 just as they do in the switch arrays 32 and 36 of FIGS. 5 and 7.

Each 2×2 sub-array 38A–38D includes a separate set of four switch cells for selectively linking two input line segments to two output line segments. For example, sub-array 38B includes the four cells 6C, 6D, 6G and 6H for selectively linking input line segments HB(0) and HB(1) to output line segments VB(2) and VB(3). Buffers BB(0) and BB(1) drive the input line segments HB(0) and HB(1) of sub-array 38B. The other sub-arrays 38A, 38C and 38D have similar topologies. Two pairs of output line segments (VA(0),VC(0)) and (VA(1),VC(1)) from sub-arrays 38A and 38C drive corresponding inputs of OR gates 40(0) and 40(1). Likewise, two pairs of output line segments (VB(2),VD(2)) and (VB(3),VD(3)) from sub-arrays 38B and 38D drive corresponding inputs of OR gates 40(2) and 40(3). The output of each OR gate 40(0)–40(3) drives a corresponding output terminal 44(0)–44(3).

When the external host computer wants crosspoint switch 33 to route, for example, input signal IN(1) to output terminal 44(2), it commands controller 14 to close cell 6G. When driver D1 buffers IN(1) onto input line H1, and buffer BB(1) buffers the signal onto input line segment HB(1), cell 6G then conducts IN(1) from input line segment HB(1) to output line segment VB(2). Line segment VB(2) then forwards the signal to an input of OR gate 40(2). OR gate 40(2) then buffers the signal onto output terminal 44(2), and receiver R2 then forwards the signal at terminal 44(2) outward as output signal OUT(2).

Figure 10:
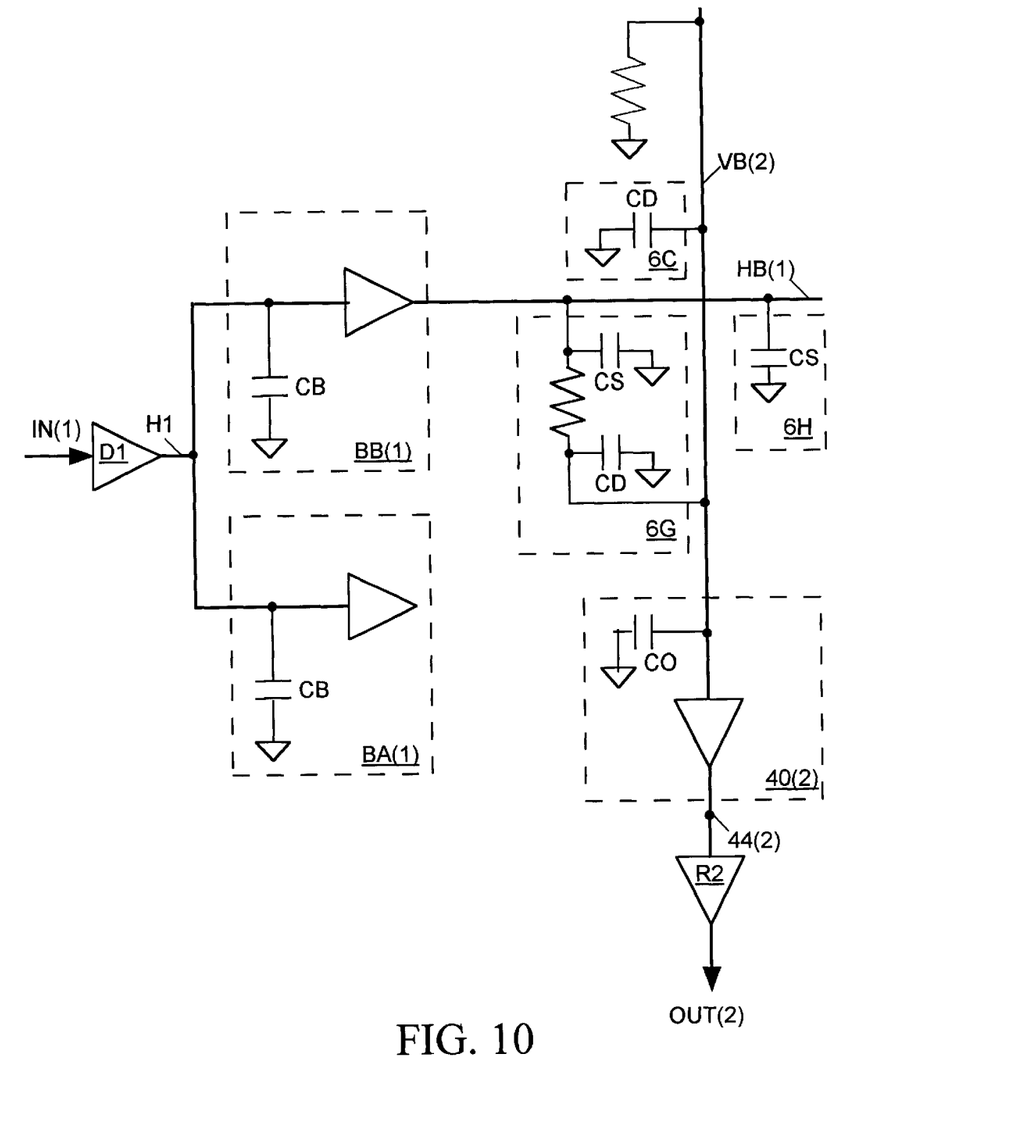
FIG. 10 is a schematic diagram depicting an impedance model of a signal path through the crosspoint switch shown in FIG. 9.

FIG. 10 is an impedance model of the path input signal IN(1) follows through array 38 to reach output terminal 44(2). Driver D1 buffers input signal IN(1) onto inputs of buffers BA(1) and BB(1) though the input capacitive CB of each buffer BA(1) and BB(1). The large input resistances of buffers BA(1) and BB(1) isolate driver D1 from the capacitive load of both sub-arrays 38A and 38B.

As can be determined from FIG. 10, there are only two pass gate transistor source capacitances CS and two pass gate transistor drain capacitances CD in the IN(1) signal path through the crosspoint array. This compares favorably to the four source and four drain capacitances in the IN(1) signal path of the prior art crosspoint array seen in the impedance model of FIG. 4. Thus by segmenting array 36 both horizontally and vertically into two rows and two columns of sub-arrays, we reduce both pass gate transistor drain and source capacitance in the signal paths by a factor of 2. For larger crosspoint switch arrays, we can attain larger reductions in signal path capacitance by horizontally and vertically segmenting the arrays into more than two rows and columns, thereby substantially reducing signal path delay.

Thus has been shown and described a high-speed crosspoint switch in accordance with the invention which has been segmented horizontally and/or vertically to reduce signal path capacitance, thereby reducing signal path delay.

While the forgoing specification has described preferred embodiment(s) of the present invention, one skilled in the art may make many modifications to the preferred embodiment(s) without departing from the invention in its broader aspects. The appended claims therefore are intended to cover all such modifications as fall within the true scope and spirit of the invention.

What is claimed is:

1. An apparatus for selectively routing a plurality of input signals to M output terminals, where M is an integer greater than three, the apparatus comprising:

N crosspoint switch arrays, wherein N is an integer greater than one, wherein each crosspoint switch array has M output lines, wherein each crosspoint switch array selectively routes a separate subset of said input signals to its M output lines; and M output buffers, wherein for all values of K from one through M, each Kth output buffer actively buffers each input signal routed to a Kth output line of any one of the crosspoint switch arrays onto a Kth one of said M output terminals, and each Kth output buffer comprises an OR gate having inputs linked to a Kth output line of each crosspoint switch array and driving the Kth one of said output terminals.

2. The apparatus in accordance with claim 1 wherein each of said crosspoint switch arrays comprises a plurality of input lines, each receiving a separate one of said input signals, and a plurality of switch cells, wherein each switch cell selectively conveys an input signal appearing on one of the input lines to a separate one of the crosspoint switch array's M output lines.

3. The apparatus in accordance with claim 2 wherein each of said switch cells comprises:

memory means for storing control data, and switch means for responding to said control data stored by said memory means when said control data is of a first state by making a signal path between said one of said input lines and said separate one of the crosspoint switch array's M output lines, and for responding to said control data when said control data is of a second state by breaking said signal path.

4. The apparatus in accordance with claim 3 further comprising control means for writing said control data into the memory means within each switch cell.

5. The apparatus in accordance with claim 3 wherein said switch means is a complementary metal oxide semiconductor (CMOS) pass gate transistor.

6. An apparatus for selectively routing N input signals to a plurality of output terminals, where N is an integer greater than three, the apparatus comprising:

M crosspoint switch arrays, where M is an integer greater than one, each crosspoint switch array comprising N input lines, each receiving a separate one of said N input signals, and a plurality of output lines, each output line being connected to a separate one of said output terminals, and wherein each crosspoint switch array selectively routes said N input signals to said plurality of output lines, and N sets of M input buffers, wherein for all values of K from one through N, the Kth set of M input buffers separately buffer a Kth one of said N input signals onto the Kth one of said N input lines of each of said M crosspoint switch arrays.

7. The apparatus in accordance with claim 6 wherein each said M crosspoint switch arrays further comprises:

a plurality of crosspoint switch cells, each selectively conveying an input signal appearing on one of said N input lines onto a separate one of the plurality of output lines of the crosspoint switch array.

8. The apparatus in accordance with claim 7 wherein each of said switch cells comprises:

memory means for storing control data; and switch means for responding to said control data stored by said memory means when said control data is of a first state by making a signal path between said one of said input lines and said separate one of the crosspoint switch array's plurality of output lines, and for responding to said control data when said control data is of a second state by breaking said signal path.

9. The apparatus in accordance with claim 8 further comprising control means for writing the control data into the memory means within each switch cell.

10. The apparatus in accordance with claim 8 wherein said switch means is a complementary metal oxide semiconductor (CMOS) pass gate transistor.

11. An apparatus for selectively routing N input signals to M output terminals, where N and M are integers each greater than three, the apparatus comprising:

an array of crosspoint switch arrays, wherein each crosspoint switch array comprises a plurality of input lines and a plurality of output lines, wherein each said crosspoint switch array selectively routes a separate subset of said N input signals to a separate subset of said M output terminals, N sets of M input buffers, wherein for all values of K from one through N, a Kth set of M input buffers separately buffers a Kth one of said N input signals onto a Kth one of said N input lines of each of said M crosspoint switch arrays; and M output buffers, wherein for all values of J from one through M, a Jth output buffer actively buffers each input signal routed to a Jth output line of any one of the crosspoint switch arrays onto a Jth one of said M output terminals.

12. The apparatus in accordance with claim 11 wherein each Jth output buffer comprises an OR gate having inputs linked to a Jth output line of each crosspoint switch array and driving a Jth one of said output terminals.

13. The apparatus in accordance with claim 11 wherein each of said crosspoint switch arrays further comprises a plurality of switch cells, wherein each switch cell selectively conveys an input signal appearing on one of the input lines to a separate one of said output lines.

14. The apparatus in accordance with claim 13 wherein each of said switch cells comprises:

memory means for storing control data; and switch means for responding to said control data stored by said memory means when said control data is of a first state by making a signal path between said one of said input lines and said separate one of said output lines, and for responding to said control data when said control data is of a second state by breaking said signal path.

15. The apparatus in accordance with claim 14 further comprising control means for writing said control data into the memory means within each switch cell.

16. The apparatus in accordance with claim 14 wherein said switch means is a complementary metal oxide semiconductor (CMOS) pass gate transistor.

* * * * *